(12) United States Patent
Montello

(10) Patent No.: US 10,335,899 B2
(45) Date of Patent: Jul. 2, 2019

(54) CROSS JET LASER WELDING NOZZLE

(71) Applicant: Prima Power Laserdyne, LLC, Champlin, MN (US)

(72) Inventor: Aaron Montello, Minneapolis, MN (US)

(73) Assignee: PRIMA POWER LASERDYNE, Champlin, MN (US)

( * ) Notice: Subject to any disclaimer, the term of this patent is extended or adjusted under 35 U.S.C. 154(b) by 773 days.

(21) Appl. No.: 14/529,900

(22) Filed: Oct. 31, 2014

(65) Prior Publication Data

US 2016/0121427 A1    May 5, 2016

(51) Int. Cl.
B23K 26/14    (2014.01)
B23K 26/20    (2014.01)
B23K 26/142   (2014.01)
B23K 26/21    (2014.01)

(52) U.S. Cl.
CPC ........ *B23K 26/1476* (2013.01); *B23K 26/142* (2015.10); *B23K 26/20* (2013.01); *B23K 26/21* (2015.10)

(58) Field of Classification Search
CPC .. B23K 26/142; B23K 26/127; B23K 26/147; B23K 26/12; B23K 26/14; B23K 26/1476
USPC ............................. 219/121.84, 21.63, 121.64
See application file for complete search history.

(56) References Cited

U.S. PATENT DOCUMENTS

| | | | |
|---|---|---|---|
| 4,000,392 A | 12/1976 | Banas et al. | |
| 4,128,753 A * | 12/1978 | Sharp | B23K 26/1476 219/121.63 |
| 4,642,445 A | 2/1987 | Stol | |
| 4,906,812 A * | 3/1990 | Nied | B23K 1/0056 219/121.63 |
| 5,148,446 A | 9/1992 | Radich | |
| 5,359,176 A * | 10/1994 | Balliet, Jr. | B23K 26/1476 219/121.67 |
| 5,981,901 A * | 11/1999 | La Rocca | B23K 26/123 219/121.63 |
| 6,534,745 B1 * | 3/2003 | Lowney | B23K 26/1482 219/121.63 |
| 6,649,867 B2 | 11/2003 | Rippl et al. | |
| 6,667,456 B2 * | 12/2003 | Mukasa | B23K 26/1476 219/121.63 |

(Continued)

FOREIGN PATENT DOCUMENTS

| | | | | |
|---|---|---|---|---|
| JP | 11-123578 | * | 5/1999 | ............. B23K 26/06 |
| JP | WO 2013137289 A1 | * | 9/2013 | ......... B23K 26/1476 |

*Primary Examiner* — Dana Ross
*Assistant Examiner* — Lawrence H Samuels
(74) *Attorney, Agent, or Firm* — Barlow, Josephs & Holmes, Ltd.

(57) ABSTRACT

A compact nozzle for laser welding is provided that includes an air knife cross-jet to protect the laser optic, coaxially supplied process shield gas and active air cooling in a singular and compact nozzle. Generally, the nozzle includes a mounting interface at a first end to connect to the laser processing device. An air knife section is positioned adjacent the mounting interface and the optical output of the laser so that the air knife flow can protect the optic from plasma and spatter damage. Further the air flow in the air knife is directed through the nozzle for direct cooling. Adjacent the air knife is the process gas shield that is isolated from the air knife such that the process gas is not contaminated by flow from the air knife.

16 Claims, 3 Drawing Sheets

(56) References Cited

U.S. PATENT DOCUMENTS

| | | | |
|---|---|---|---|
| 7,022,941 B2 | 4/2006 | Joseph et al. | |
| 7,044,610 B2* | 5/2006 | Beyer | B08B 15/04 |
| | | | 347/22 |
| 7,241,965 B2* | 7/2007 | Burt | B23K 26/147 |
| | | | 219/121.63 |
| 7,319,204 B2* | 1/2008 | Schafer | B23K 26/0648 |
| | | | 219/121.63 |
| 7,379,483 B2* | 5/2008 | Denney | B23K 26/032 |
| | | | 219/121.78 |
| 7,456,370 B2 | 11/2008 | Beeson et al. | |
| 7,605,345 B2* | 10/2009 | Fukuda | B23K 26/147 |
| | | | 219/121.84 |
| 8,344,285 B2* | 1/2013 | Sykes | B23K 26/12 |
| | | | 219/121.68 |
| 8,487,209 B2 | 7/2013 | Sakamoto et al. | |
| 8,809,732 B2* | 8/2014 | Sykes | B23K 26/12 |
| | | | 219/121.68 |
| 8,866,040 B2* | 10/2014 | Ko | B23K 26/127 |
| | | | 219/121.63 |
| 2002/0179582 A1* | 12/2002 | Reichmann | B23K 26/0665 |
| | | | 219/121.84 |
| 2003/0034333 A1* | 2/2003 | Horner-Richardson | |
| | | | H05H 1/34 |
| | | | 219/121.51 |
| 2005/0224470 A1* | 10/2005 | Burt | B23K 26/147 |
| | | | 219/121.63 |
| 2007/0210040 A1* | 9/2007 | Sakamoto | B23K 26/0884 |
| | | | 219/121.63 |
| 2012/0234804 A1* | 9/2012 | Ko | B23K 26/127 |
| | | | 219/121.63 |
| 2015/0048071 A1* | 2/2015 | Shioji | B23K 26/1476 |
| | | | 219/121.84 |

* cited by examiner

CROSS JET LASER WELDING NOZZLE

BACKGROUND OF THE INVENTION

The present invention relates generally to a compact nozzle for laser welding. More specifically, the present invention relates to a laser welding nozzle that includes an air knife cross-jet to protect the laser optic, coaxially supplied process shield gas and active air cooling in a singular and compact nozzle.

Metal welding techniques have been researched, practiced and improved over a very long period of time. During this period a great many discoveries and advancements have been made in the manner in which a fusion weld is formed. In a conventional arc welding process, which is typical of the metal welding processes in use today, various impurities tend to contaminate the weld zone during the welding process and degrade the quality of the weld.

Various methods and systems have been used to minimize contamination in the fusion zone during these welding processes. For example, some of the more obvious steps include mechanical cleaning of the metals to be joined by such techniques as scrubbing, grit blasting and/or chemical cleaning. In addition, the workpiece to be joined may be preheated in order to drive off any adsorbed gases and moisture present. Similarly, through selective care and handling of the filler metal rods, the impurities which could otherwise enter into the weld zone from this source are minimized.

During the development of arc welding techniques, various gas shielding devices and methods have evolved that contribute significantly to the reduction of impurities in the weld zone. Additionally, cover gas or flux, as the case may be, can be maintained relatively contamination free subject to arc stability requirements. Another technique for minimizing the impurity content in the final weld is to use a filler rod having a suitable offsetting composition that complements the composition of the base metal in a manner which results in a final weld material composition that is within some preselected range.

Given the proximity of the laser focusing and delivery optics to the weld zone there is also a risk that welding plasma, slag and splatter can accumulate on the laser output optic. To protect against this blowing devices have been used. These devices typically have an elongated nozzle, which is directed at right angles to the laser beam and generate a gas flow passing through the laser beam. On the underside, the nozzle has an air feed, which opens in the vicinity of the nozzle opening and via which an incoming air flow can be fed to the gas flow at an acute angle. The housing of the laser head joins on the other side of the nozzle.

One of the major problems with these arrangements is that to accommodate the airflow required to effectively shield the optic and to provide the needed flow of process gas two separate feed systems and gas shrouds must be installed on or about that laser processing heads. This creates a system that is typically large and bulky in a manner that is not compatible with small movable laser processing head systems.

There is therefore a need for a system that provides a laser welding head that combines both a cross jet air knife to protect the laser processing optic as well as a gas shield delivery system into single compact apparatus. There is a further need for an apparatus that provides an air knife having airflow that is directed in a manner that provides active cooling of the laser while also directing flow in a manner that does not interfere with the process gas utilized in the shield delivery system.

BRIEF SUMMARY OF THE INVENTION

In this regard, the present invention provides a compact nozzle for laser welding that includes an air knife cross-jet to protect the laser optic, coaxially supplied process shield gas and active air cooling in a singular and compact nozzle.

Generally, the nozzle includes a mounting interface at a first end to connect to the laser processing device. An air knife section is positioned adjacent the mounting interface and the optical output of the laser so that the air knife flow can protect the optic from plasma and spatter damage. Further the air flow in the air knife is directed through the nozzle for direct cooling. Adjacent the air knife is the process gas shield that is isolated from the air knife such that the process gas is not contaminated by flow from the air knife.

It is an object of the present invention to provide a compact laser welding nozzle that includes both an air knife to protect the laser optic and a gas shield delivery system for the delivery of process gas.

It is a further object of the present invention to provide a compact laser welding nozzle head that combines a cross jet air knife to protect the laser processing optic as well as a gas shield delivery system into single compact apparatus while also directing an active cooling flow in a manner that does not interfere with the process gas utilized in the shield delivery system.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
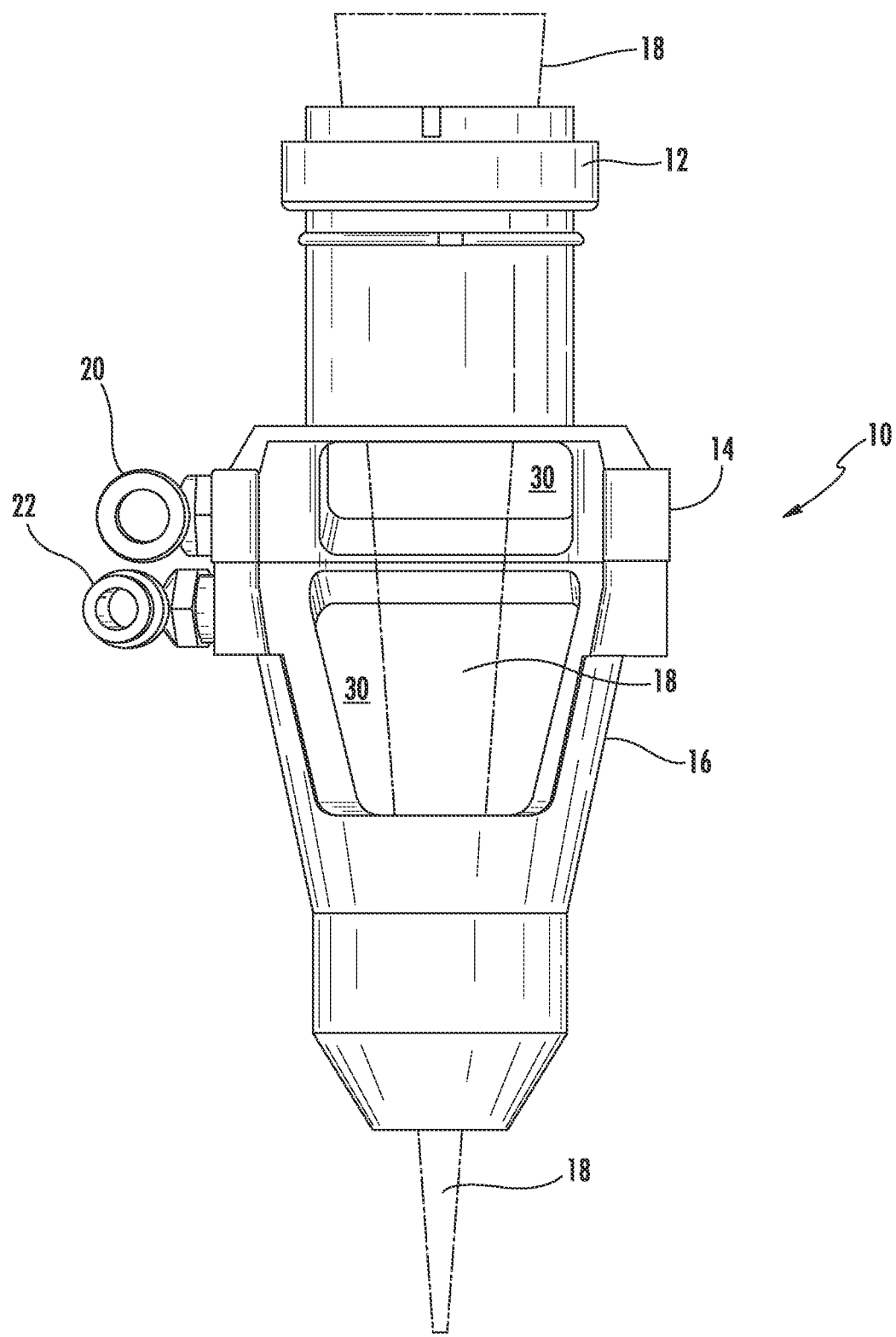
FIG. 1 is a partial cut away view of the laser welding nozzle of the present invention.

Now referring to the drawings, the present invention provides a compact nozzle for laser welding that includes an air knife cross-jet to protect the laser optic, coaxially supplied process shield gas and active air cooling in a singular and compact nozzle.

As can be seen in FIG. 1, generally, the nozzle 10 includes a mounting interface 12 at a first end to connect to the laser processing device. An air knife section 14 is positioned adjacent the mounting interface 12 and the optical output of the laser so that the air knife 14 flow can protect the optic from plasma and spatter damage. Further, the air flow in the air knife is directed through internal pathways in the nozzle 10 for direct cooling. Adjacent the air knife 14 is the process gas shield 16 that is isolated from the air knife 14 such that the process gas is not contaminated by flow from the air knife. The nozzle 10 has a pathway concentrically positioned throughout its center to allow the laser energy 18 to pass therethrough substantially unimpeded.

The nozzle 10 has two gas fittings 20, 22. The upper gas fitting 20 supplies compressed air to drive the air knife and active air cooling. The lower gas fitting 22 supplies the process gas to the concentric process gas shield. As can be seen, the gas fittings 20, 22 are located near the top of the nozzle 10 and away from the process area. As will be better described below, the air and process gas paths are routed internally through the nozzle 10. By placing the gas fittings 20, 22 near the top of the nozzle 10 and adjacent the mounting interface 12, the gas tubing/supply lines are kept out of the way to allow the laser cutter to have better access and maneuverability in and around complex 3-D parts. Further, this arrangement keeps the gas tubing/supply lines and fittings away from the high temperature process zone.

Figure 2:
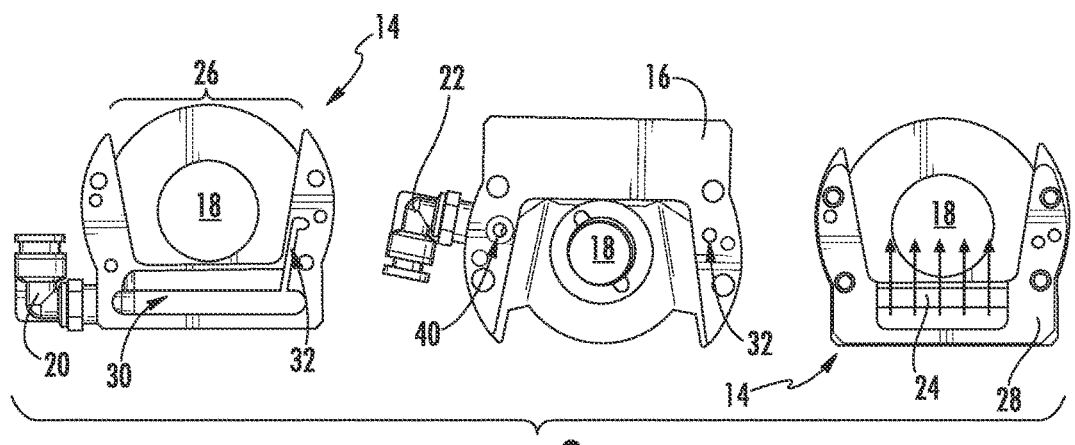
FIG. 2 is a top view of the layers making up the laser welding nozzle of the present invention.

Turning now to FIG. 2, the various layers and airflow paths for the laser welding nozzle are shown. In the air knife 14 cross-jet portion of the nozzle airflow 24 that runs substantially perpendicular to the laser bean 18 is utilized for protection of the optics (upstream from the nozzle) from spatter and debris generated in the weld process. The air knife flow rate determines the efficacy for debris rejection, and can be controlled by changing either or both the air pressure and slot 26 opening width. The pressure of the air fed to the air knife 14 via air supply 20 can be controlled via external means using a manual or automatic valve arrangement and the air-knife opening gap height can be set by the number of shims 28 used between the upper and lower portions of the nozzle (typically 1 or 2 shims of 0.002" thickness are used). The large openings 30 in the weld nozzle above and below the air-knife slot 26, seen in FIG. 1, allow for entrainment of ambient air into this flow, which represents the majority of the air in the cross-jet flow. In creating initial airflow, ambient air is also drawn along by the vacuum created. The ambient air is drawn through the openings 30. The position of the air knife and the size of the openings are both very important in preventing the suction created by the air-knife from affecting the process shield gas.

Figure 3:
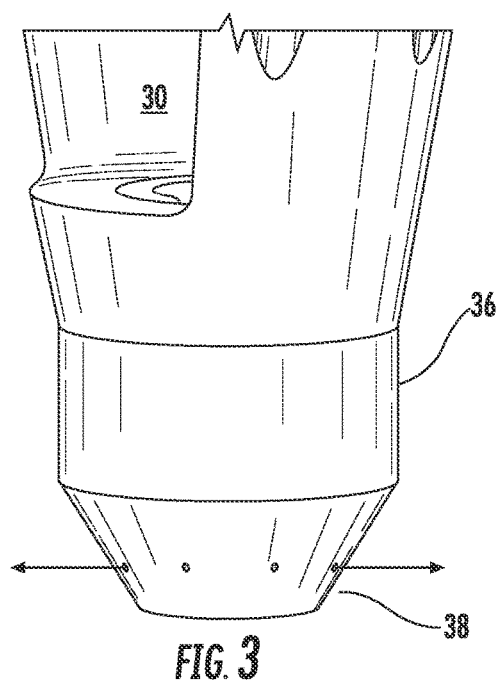
FIG. 3 is a perspective view of the nozzle with the tip installed.
Figure 4:
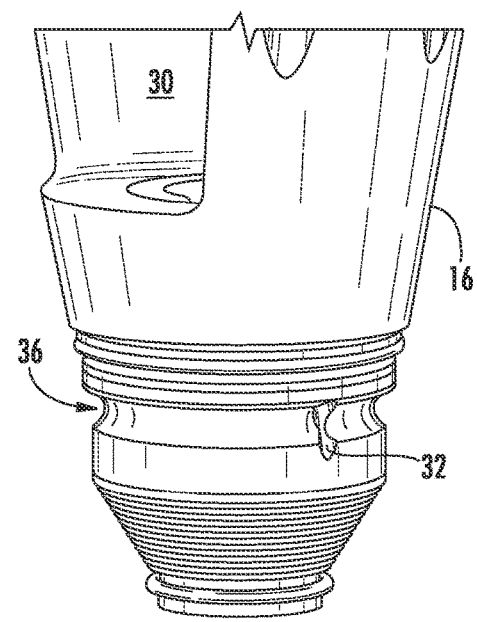
FIG. 4 is a perspective view of the nozzle with the tip removed.

The air supply 20 is also employed to operate an active air cooling system that is designed to cool the nozzle during high power, thick section or low speed welding, where heat radiating from the weld bead can cause significant heating in the nozzle. The active cooling system uses air supplied through the same air supply 20 as the cross-jet air knife 14. The air is delivered internally to a cooling air reservoir 30, via the cooling air supply path 32. Air is delivered to both the air knife and the cooling air reservoir. The air in the cooling reservoir is then directed through drilled passageways down the process gas 16 portion of the nozzle. As can be seen in FIGS. 3 and 4, the air is directed down the cooling pathway 32 into a chamber 34 at the tip of the nozzle. A cover 36 installed on the nozzle seals the chamber 34 and directs the airflow to small exhaust holes 38 drilled into the cover 36. These holes are drilled perpendicular to the optical axis of the laser and they create small jets of exhaust air parallel with the work piece surface (for one example case of perpendicular welding of a flat sheet). The air flow is directed in this fashion to eliminate creation of turbulence or mixing of the air jets with the process shield gas near the welding region. In the event complex 3-D parts or fixtures cause problems by directing the exhaust air flow into the process region, some of the holes can be blocked, or the cover can be replaced with one with no holes. Portions of the surfaces on the tip of the nozzle can be seen as being textured, to enhance the heat removal process.

Figure 5:
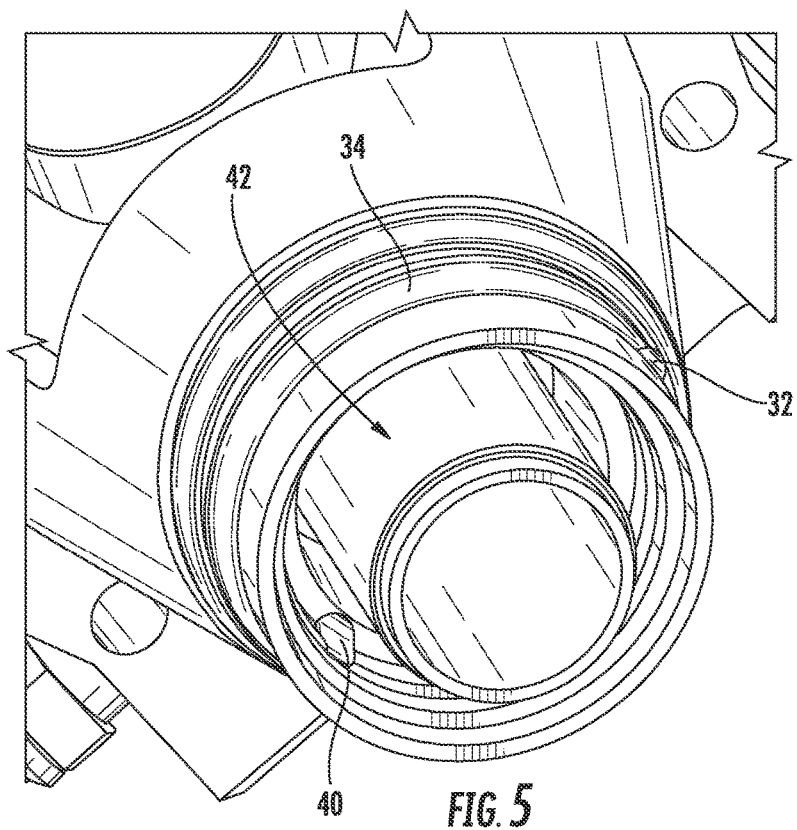
FIG. 5 is a bottom perspective view of the nozzle with the tip removed.

Returning to FIG. 2, process shield gas is routed from gas supply 22 internally through passageway 40 through the nozzle. As can be seen in FIG. 5, the process gas exits the passageway 40 and fills a process gas reservoir 42 that is concentric with the laser beam 18. This process gas reservoir is sealed from the outer active air cooling chamber 34 to prevent mixing of the shield gas with the cooling air. The flow of the process gas is restricted at the tip of the nozzle coaxial with the laser beam 18. This allows for a low speed diffuse flow of process gas to "flood" the interior of the laser beam path 18, creating an atmosphere of the process shield gas in this location. The shield gas then flows at very low speed down the optical axis, into the laser/material interaction region. Turbulence and/or mixing of the shield gas and surrounding air, which can be very common in non-coaxial shielding arrangements, can cause quality issues for laser welding. This turbulence and mixing is prevented here due to the very low gas flow rate produced in this arrangement.

Figure 6:
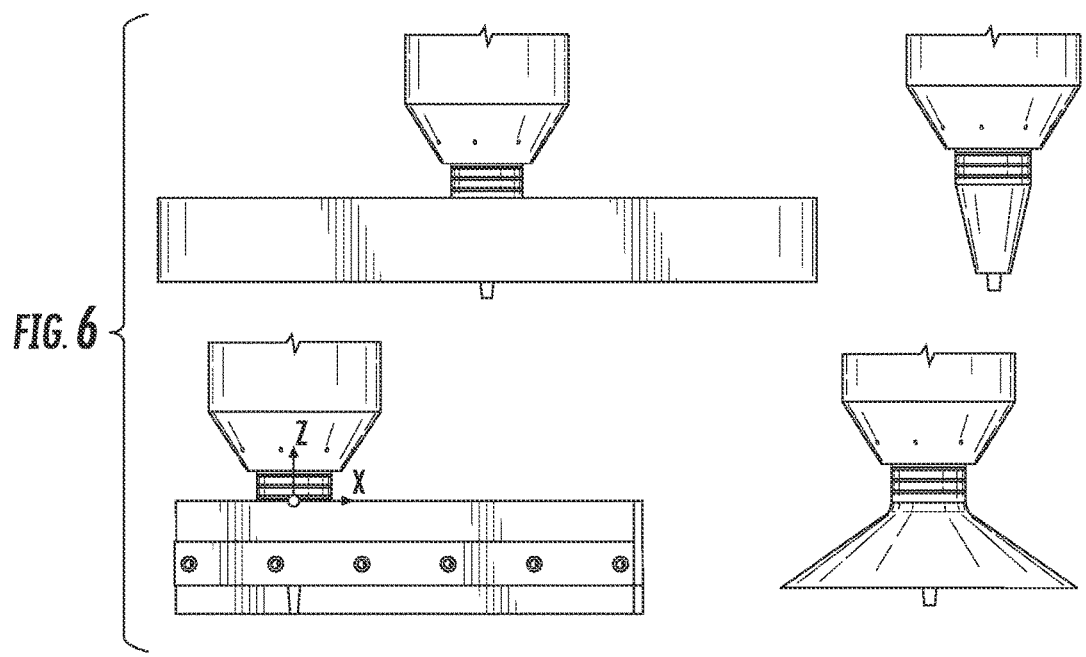
FIG. 6 is an illustration of various welding shoe attachments that can be installed on the nozzle.

As is shown at FIG. 6, the bottom of the nozzle is designed to allow the attachment of any number of different size/shaped nozzle tips or shoes, a few examples of which are shown. These and other nozzle tips and shoes can increase the area the shield gas is supplied to.

It can therefore be seen that the present invention provides a compact laser welding nozzle that includes both an air knife to protect the laser optic and a gas shield delivery system for the delivery of process gas. Further, the present invention provides a compact laser welding nozzle head that combines a cross jet air knife to protect the laser processing optic as well as a gas shield delivery system into single compact apparatus while also directing an active cooling flow in a manner that does not interfere with the process gas utilized in the shield delivery system. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A nozzle for a laser welding system that directs a laser beam along an optical axis through an optic onto a work piece, said nozzle comprising:
    a first gas directing section that upon receiving a single airflow simultaneously directs both a first portion of said airflow through said laser beam in a direction substantially perpendicular to said optical axis of said laser beam and a second portion of said single airflow through cooling passages in said nozzle and outwardly through exhaust holes adjacent said work piece; and
    a second gas directing section that directs a process gas flow through a passageway in said nozzle to a process gas reservoir concentric with said laser beam and out an output end of said nozzle, said process gas filling the pathway of said laser beam.

2. The nozzle of claim 1, wherein said first portion of said airflow is an air knife.

3. The nozzle of claim 2, wherein the flow of said air knife entrains ambient air to create an air barrier to protect said optic from byproducts generated during laser welding.

4. The nozzle of claim 1, wherein said first portion of said airflow creates a barrier to protect said optic from byproducts generated during laser welding.

5. The nozzle of claim 1, further comprising:
   at least one opening in said nozzle positioned between said first gas directing section and said second gas directing section to allow said first portion of said air flow to draw in ambient air and prevent said first portion of said airflow from drawing process gas from said second gas directing section.

6. The nozzle of claim 1, wherein said second portion of said airflow is directed through cooling passages in said nozzle to a cooling reservoir at said output end of said nozzle and outwardly through openings at said output end.

7. The nozzle of claim 6, wherein said openings at said output end direct said second portion of said airflow in a direction outwardly and away from said work piece.

8. The nozzle of claim 6, wherein said output end of said nozzle is textured adjacent said cooling reservoir to enhance heat transfer.

9. An apparatus for conducting laser welding, comprising:
   a laser beam generating device that directs a laser beam through an optic onto a work piece;
   a nozzle comprising:
      a first gas directing section that upon receiving a single airflow simultaneously directs both a first portion of said airflow through said laser beam in a direction substantially perpendicular to said optical axis of said laser beam and a second portion of said single airflow through cooling passages in said nozzle and outwardly through exhaust holes adjacent said work piece; and
      a second gas directing section that directs a process gas flow through a passageway in said nozzle to a process gas reservoir concentric with said laser beam and out an output end of said nozzle, said process gas filling the pathway of said laser beam.

10. The apparatus of claim 9, wherein said first portion of said airflow is an air knife.

11. The apparatus of claim 10, wherein the flow of said air knife entrains ambient air to create an air barrier to protect said optic from byproducts generated during laser welding.

12. The apparatus of claim 9, wherein said first portion of said airflow creates a barrier to protect said optic from byproducts generated during laser welding.

13. The apparatus of claim 9, further comprising:
   at least one opening in said nozzle positioned between said first gas directing section and said second gas directing section to allow said first portion of said air flow to draw in ambient air and prevent said first portion of said airflow from drawing process gas from said second gas directing section.

14. The apparatus of claim 9, wherein said second portion of said airflow is directed through cooling passages in said nozzle to a cooling reservoir at said output end of said nozzle and outwardly through openings at said output end.

15. The apparatus of claim 14, wherein said openings at said output end direct said second portion of said airflow in a direction outwardly and away from said work piece.

16. Then apparatus of claim 14, wherein said output end of said nozzle is textured adjacent said cooling reservoir to enhance heat transfer.

* * * * *